United States Patent Office 3,041,179
Patented June 26, 1962

3,041,179
PECTIN COMPOSITION AND METHOD OF
MAKING THE SAME
Bruce A. Lister, Baldwin, and Nicholas D. Pintauro, New City, N.Y., assignors to General Foods Corporation, White Plains, N.Y., a corporation of Delaware
No Drawing. Filed Sept. 8, 1959, Ser. No. 838,409
14 Claims. (Cl. 99—132)

This invention relates to jelly-forming compositions which contain pectin and more specifically to a pectin-containing product which is characterized by superior properties.

As is well known to those skilled-in-the-art, pectin may be prepared from e.g. apple pomace or citrus peel by a process wherein undesirable solubles may be first removed by a water leaching treatment. The moist, leached material may then be treated with acid at elevated temperature, the time and pH of the treatment being interdependent. During the acid treatment, pectin is solubilized. The inert fibrous material may be separated from the aqueous pectin extract and pectin is recovered in dry form by precipitation.

The pectin so-produced may find ready use in the formation of jellies by combining with various fruit and fruit juices. More specifically, the pectin may be commonly sold in the form of a mixture of more-or-less standard weight containing 1–4 grams of pectin together with a substantial additional amount of a dispersant or filler, usually a carbohydrate such as glucose or dextrose, in amount of e.g. 5–80 grams of carbohydrate per 1–4 grams of pectin. It will be apparent that the amount of pectin in the product will be dependent on the grade i.e. the jelling ability. This mixture commonly contains an acid in amount sufficient to permit attainment in the jelly product of the desired pH and tartness. Citric acid is commonly employed in amount of about 5–12 grams per 1–4 grams of pectin, and this will commonly give a product pH of 2.6–3.6.

Although jellies may be prepared by addition of such a mixture to fruit or fruit juices, it is also possible to make a jelly by addition of such a mixture to fruit flavors and color and to thus permit preparation of a jelly by combining with water alone. Such a jelly is commonly called a synthetic jelly or a water jelly. It will be understood of course that these jellies prepared with water or fruit juices require addition of sugar.

Typically the jelly-forming mixtures which are adapted to be made into jellies by addition thereof to water (as distinguished from those which are adapted to be formulated by addition to fruit or fruit juices) are relatively unbuffered because of the absence of fruit buffer salts. Attainment of optimum tartness to give maximum palatability is commonly effected by addition of acids—usually citric, tartaric, or fumaric acid. The pH of such products is typically low and it may be as low as about 2.0.

Although such a combination may be suitable insofar as tartness is concerned, the low pH does not permit realization of full gelling capacity of the pectin. In other words, it requires much more pectin to achieve the same final jelly strength in a pH 2.0 jelly than for a pH 3.0 jelly.

Furthermore, fruits and fruit juices (depending on the type, variety, or maturity) contain variable amounts of fruit acids and buffer salts which affect the pH of the finished jelly and in many instances, the resulting pH does not permit most efficient utilization of the pectin.

Accordingly, attempts have been made to remedy this defect, in the case of unbuffered jellies which are adapted to be formulated with water alone rather than fruit juices, by addition of buffer salts which raise the pH. For example, in the case of citric acid which gives a pH of 2.1, the addition of sodium citrate, sodium phosphate, etc. has been tried; but it is found that amount of the buffer salt must be as much as 15% of the acid-buffer combination to achieve the pH required for most efficient utilization of the pectin. Under these conditions, the salt concentration is so great that it has deleterious effects on the jelly product and on the taste characteristics of the product. More specifically, the high concentration of buffer has an undesirably softening effect on the finished jelly; it undesirably reduces and modifies the tartness character of the acid; and it makes the product unsuitable for low sodium dietetic uses.

The use of other acids which substantially raise the pH has been tried. For example, adipic acid has been tried; but the amount of adipic acid necessary to attain optimum tartness gives a pH of 3.2. Such a pH may be satisfactory under certain specific conditions: i.e. when the pectin used is a high methoxyl-type pectin e.g. 73 D.M.; when the pectin combination is sufficiently fresh; and when the jelly solids are above 63% by weight. However, as the mixture departs from these ideal conditions, i.e. as the pectin employed has a D.M. below 73, as the pectin D.M. changes on storage, and when the composition employed contains jelly solids in amount less than 63%, most efficient utilization of the pectin is not obtained.

Addition of buffers e.g. sodium citrate to the adipic acid would permit attainment, at optimum tartness, of an unusably high pH of 3.8 which is outside the practical range of jellying performance.

Accordingly, it has not heretofore been possible to produce a pectin mixture which, upon addition of water and sugar, and in many cases fruits or fruit juices, would produce a jelly of proper tartness and desired pH for most efficient utilization of the pectin.

It is an object of this invention to provide a pectinaceous jelly forming composition characterized by optimum tartness, optimum pH, most efficient utilization of pectin, and low cost. Other objects will be apparent to those skilled-in-the-art on inspection of the following description.

In accordance with this invention, a jelly-forming composition characterized by the above mentioned desiderata may be prepared by mixing together pectin, a dispersant, fruit acid and adipic acid.

Pectin, as the term is used herein, includes all types of commercially available pectins manufactured for jelly use including slow and rapid set pectin, i.e. pectins having a wide range of degrees of methylation, natural or synthetic. The pectin, for example, may be ammonium pectinate or sodium pectinate. It is a particular feature of this invention that the advantages may be obtained regardless of the origin, method of manufacture, degree of methylation, particle size, solubility, type and amount of ash, and degree of neutralization or jelly grade. It may be noted that these advantages may be more readily apparent when the degree of methylation of the pectin is between 60 and 73 D.M.

Commonly the pectin which is employed will have a fine particle size of 100% through 80-mesh and about 62% maximum through 140-mesh.

The dispersant or filler which may be employed in connection with this invention serves several purposes. It provides a bulk to the product which makes it readily handleable, which it would not otherwise be. It also serves to keep separate the various ingredients of the mixture i.e. the pectin and the acid, thereby minimizing any undesirable effects prior to use. It also serves to provide a source of soluble solids and sweeteners in the final jelly thereby decreasing the amount of this material which must be added by the ultimate fabricator of the jelly.

Preferably the dispersant may be a soluble sugar; and typically it may be dextrose although sucrose or lactose can be employed. Commonly the dispersant, dextrose, will be present in amount of 5–80 grams, say 17–22 grams per 1–4, say about 2.5 grams of pectin. A preferred mixture may contain 2.5 grams of pectin and 17–18 grams of dextrose. The dextrose may be anhydrous, but preferably it will be hydrated (e.g. to 8.8% water—one molecule of water of crystallization).

Typically, the dispersant which is employed in the compositions of the instant invention, may preferably have a fine particle size of about 100% through 40-mesh and 65% through 100-mesh which approaches very closely the particle size distribution of the pectin.

As will be apparent, the total amount of acid, including fruit acid and adipic acid which is to be employed in accordance with this invention will be dependent on the pH and tartness desired in the finished jelly product. The total amount of acid determines the tartness level; while the proportionate amount of fruit acid and adipic acid determines the product pH.

Preferably the total amount of acid including fruit acid and adipic acid may be ca. 3.18 grams to 30 grams, but more commonly 8.75–12.50 grams per 1–4 grams of pectin.

The fruit acids which may be used, individually or severally, include e.g. tartaric acid and fumaric acid and citric acid.

The amount of adipic acid which may be employed in practice of this invention will be dependent on the pH desired. Preferably when it is desired to obtain a pH of 2.7–3.0, say 2.85, the adipic acid will be present in amount of 0.66 g.–9.0 g., preferably 5.0 g. per gram of fruit acid. Alternatively expressed, it is preferred that the adipic acid be present in amount of about 40%–90%, say 83% of the total acid.

In the combination of this invention, the adipic acid performs a dual function. Firstly it contributes tartness (which together with the tartness contribution of the fruit acid makes up the total desired tartness); and secondly, it functions as a buffer i.e. modifies the pH of the ultimate product to the desired region of 2.7–3.0, say 2.85 and it stabilizes the pH at this point.

The amount of fruit acid present in the mixture may vary depending upon the particular acid employed, but in each case it will be sufficient to bring the total acid content to the hereinbefore noted total. In order to attain the desired tartness, the total amount of acids, fruit acid and adipic acid, may vary depending on the particular fruit acid. For a typical package containing 1–4 grams of pectin, the amounts of dry acids may be as follows:

Acids: Grams per pkg.
    Citric acid plus adipic acid___ 5.0–16.0, preferably 8.75–12.50
    Tartaric acid plus adipic acid__ 4.0–14.0, preferably 8.0–12.0
    Fumaric acid plus adipic acid_ 3.0–12.0, preferably 6.0–9.0

When this invention is used to produce a finished jelly for the consumer market rather than a dry composition for the preparation of jellies by the consumer, the acids are prepared as solutions for addition to the jelly batch. In such cases phosphoric acid syrup can be used as one of the fruit acids in place of the dry acids heretofore referred to. When phosphoric acid is used, the corresponding amount of total acids, phosphoric and adipic acid, may be 2.00–16.00 grams, preferably 8.00–10.00 grams per 1–4 grams of pectin.

It may be noted that the use of the particular combination of adipic acid and fruit acids as disclosed in this application unexpectedly permits attainment of all the advantages which may be present when ordinary buffer salts are employed, but without the commonly recognized compensating disadvantages. The most common of these disadvantages include the high concentrations required, the undesirable effect on taste, the undesirable softening effect on the pectin jelly, the increased amount of pectin required to give the desired standard jelly strength, the high cost of the buffer reagent and inability of the product to be used in low sodium diets.

Commonly the acids, including adipic acid and the fruit acids, as employed are in granular or fine powder crystal form, having typical particle size such that 100% passes through a 40-mesh screen and 40% through 100 mesh. Commonly the average particle size will be from 0.10 mm. to 0.33 mm.

When phosphoric acid (i.e. orthophosphoric acid) is used, it will be used in the commercially available concentrations of 30%–85%, by weight, typically 85%.

*Example I*

A water jelly composition was prepared by dry mixing the following ingredients:

|  | Grams |
|---|---|
| Pectin (D.M. 73) | 2.5 |
| Adipic acid | 7.875 |
| Citric acid | 0.875 |
| Dextrose | 16.15 |
| Color | 0.5 |
| Flavor | 0.5 |
|  | 28.4 |

This dry mixture was added to 2 cups of water and heated to dissolve. Three cups of sugar were added and the mixture heated with agitation. The liquid was poured into four eight ounce jelly glasses wherein it jelled.

*Example II*

A water jelly composition was prepared by dry mixing the following ingredients:

|  | Grams |
|---|---|
| Pectin (D.M. 68) | 2.5 |
| Adipic acid | 7.875 |
| Fumaric acid | 0.585 |
| Dextrose | 16.44 |
| Color | 0.5 |
| Flavor | 0.5 |
|  | 28.4 |

This dry mixture was added to 2 cups of water and heated to dissolve. Three cups of sugar were added and the mixture heated with agitation. The liquid was poured into four eight-ounce jelly glasses wherein it jelled.

*Example III*

A jelly composition was prepared by dry mixing the following ingredients:

|  | Grams |
|---|---|
| Pectin (D.M. 70) | 2.5 |
| Adipic acid | 5.20 |
| Tartaric acid | 3.50 |
| Dextrose | 17.2 |
|  | 28.4 |

This dry mixture was added to three cups of grape juice. Three cups of sugar were added and the mixture heated with agitation. The liquid was poured into four eight-ounce jelly glasses wherein it jelled.

*Example IV*

A jelly composition was prepared by dry mixing the following ingredients:

|  | Grams |
|---|---|
| Pectin (D.M. 66) | 1.50 |
| Adipic acid | 5.250 |
| Citric acid | 1.75 |
| Tartaric acid | 1.75 |
| Dextrose | 18.15 |
|  | 28.4 |

This dry mixture was added to 24 ounces of frozen strawberries containing sugar and the mixture was brought to a boil. 3 cups of sugar were added and the mixture heated with agitation. It was then poured into glasses wherein it jelled.

*Example V*

This example illustrates a product wherein the desired pH was attained by use of liquid phosphoric acid in combination with adipic acid to produce an artificially flavored jelly for baker's use:

|  | Grams |
|---|---|
| Pectin (D.M. 66) | 2.5 |
| Adipic acid | 7.875 |
| Phosphoric acid (85%) | 0.42 |
| Dextrose | 16.605 |
| Color | 0.5 |
| Flavor | 0.5 |
|  | 28.4 |

The dry ingredients were added to two cups of water and the liquid phosphoric acid then added. The mixture was heated to dissolve the components. Three cups of sugar were added and the mixture heated with agitation. The liquid was poured into a bulk container, and allowed to cool and set.

*Example VI*

This example illustrates an undesirable product wherein the desired pH was attained by use of a buffer. The following ingredients were dry mixed:

|  | Grams |
|---|---|
| Pectin (D.M. 73) | 2.5 |
| Citric acid | 8.75 |
| Sodium citrate | 1.80 |
| Dextrose | 14.35 |
| Color | 0.5 |
| Flavor | 0.5 |
|  | 28.4 |

This dry mixture was added to 2 cups of water and heated to dissolve. Three cups of sugar were added and the mixture heated with agitation. The liquid was poured into four eight-ounce jelly glasses wherein it jelled.

Comparison of Example I with Example VI revealed that although they both had substantially the same jelly pH, the taste characteristics of the two products were quite different. The product of Example VI was found to be distasteful, and to have insufficient tartness, and lower jelly strength. If the product were prepared with less buffer, e.g. 1.0 g., it would be found to have even a lower jelly strength because of the lower pH—thus it would require additional pectin to give a standard product.

Although this invention has been described in connection with certain specific examples, numerous modifications may be made thereto as will be apparent to those skilled-in-the-art.

The term D.M. as used in this application refers to the degree of methylation of the pectin. As is well known, pectin is made up of repeating polygalacturonide units and the pectin molecule bears carboxyl groups thereon. Some of these groups are free carboxyl groups, some are in the form of metal salts, and some are in the form of methyl esters. The relative proportion of the modified and unmodified carboxyl groups determines the properties of the pectin. Particularly significant is the number of methyl groups, and this number is commonly designated by the term D.M.—degree of methylation, which is defined as the ratio of the number of methyl groups: to the sum of the methyl and carboxyl groups times 100. A pectin having a D.M. of 100 would be one wherein all the carboxyl groups were methylated. A 73 D.M. pectin, as used in Example I, is one wherein 73% of the carboxyl groups are methylated, etc.

We claim:
1. The method of making a jelly forming composition characterized by optimum tartness, optimum pH, most efficient pectin utilization, and low cost, which comprises mixing together pectin, a dispersant, a fruit acid, and adipic acid.
2. The method claimed in claim 1 wherein said fruit acid is a dry fruit acid.
3. The method claimed in claim 1 wherein said fruit acid is selected from the group consisting of citric acid, fumaric acid, and tartaric acid.
4. The method claimed in claim 1 wherein said fruit acid is phosphoric acid.
5. The method claimed in claim 1 wherein said adipic acid and said fruit acid are present in amount sufficient to provide desired tartness at a pH level of 2.7–3.0.
6. The method claimed in claim 5 wherein the adipic acid is present in amount of 6%–47% of the total of fruit acid plus adipic acid.
7. The method of making a jelly forming composition characterized by optimum tartness, optimum pH, most efficient pectin utilization, and low cost, which comprises mixing together pectin, a dispersant, adipic acid, and a fruit acid selected from the group consisting of citric acid, fumaric acid, and tartaric acid, the total amount of said acids per 1–4 parts by weight of pectin being as follows:

| Fruit Acid | Minimum | Maximum | Preferred |
|---|---|---|---|
| Citric Acid | 5.0 | 16.0 | 8.75–12.50 |
| Tartaric Acid | 4.0 | 14.0 | 8.0–12.0 |
| Fumaric Acid | 3.0 | 12.0 | 6.0–9.0 |

8. The method of making a jelly forming composition characterized by optimum tartness, optimum pH, most efficient pectin utilization, and low cost, which comprises mixing together pectin, a soluble sugar as a dispersant, a fruit acid, and adipic acid.
9. The method as claimed in claim 8 wherein said soluble sugar is selected from the group consisting of dextrose, sucrose, and lactose.
10. A jelly-forming composition characterized by optimum tartness, optimum pH, most efficient pectin utilization, and low cost, comprising pectin, a dispersant, a fruit acid, and adipic acid.
11. A jelly-forming composition characterized by optimum tartness, optimum pH, most efficient pectin utilization, and low cost, comprising pectin, a dispersant, adipic acid, and a fruit acid selected from the group consisting of citric acid, fumaric acid, and tartaric acid.
12. A jelly-forming composition characterized by optimum tartness, optimum pH, most efficient pectin utilization, and low cost, comprising pectin, a dispersant, a fruit acid, and adipic acid, said fruit acid and adipic acid being present in amount sufficient to provide desired tartness at pH level of 2.7–3.0.
13. A jelly-forming composition characterized by optimum tartness, optimum pH, most efficient pectin, utilization, and low cost, comprising pectin, a soluble sugar as a dispersant, a fruit acid, and adipic acid.
14. A jelly-forming composition characterized by optimum tartness, optimum pH, most efficient pectin utilization, and low cost, comprising pectin, a dispersant, selected from the group consisting of dextrose, sucrose, and lactose, a fruit acid, and adipic acid.

References Cited in the file of this patent

UNITED STATES PATENTS

| 1,968,704 | Preston | July 31, 1934 |
| 2,421,093 | Thompson | May 27, 1947 |
| 2,657,996 | Ferguson | Nov. 3, 1953 |

FOREIGN PATENTS

| 355,130 | Great Britain | Aug. 20, 1931 |